INVENTORS:
HILDEGARD SCHNORING, WILLY CLASSE, GOTTFRIED PAMPUS, NIKOLAUS SCHON, JOSEF WITTE.

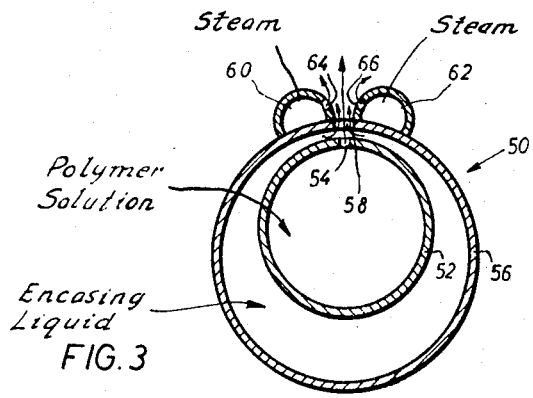
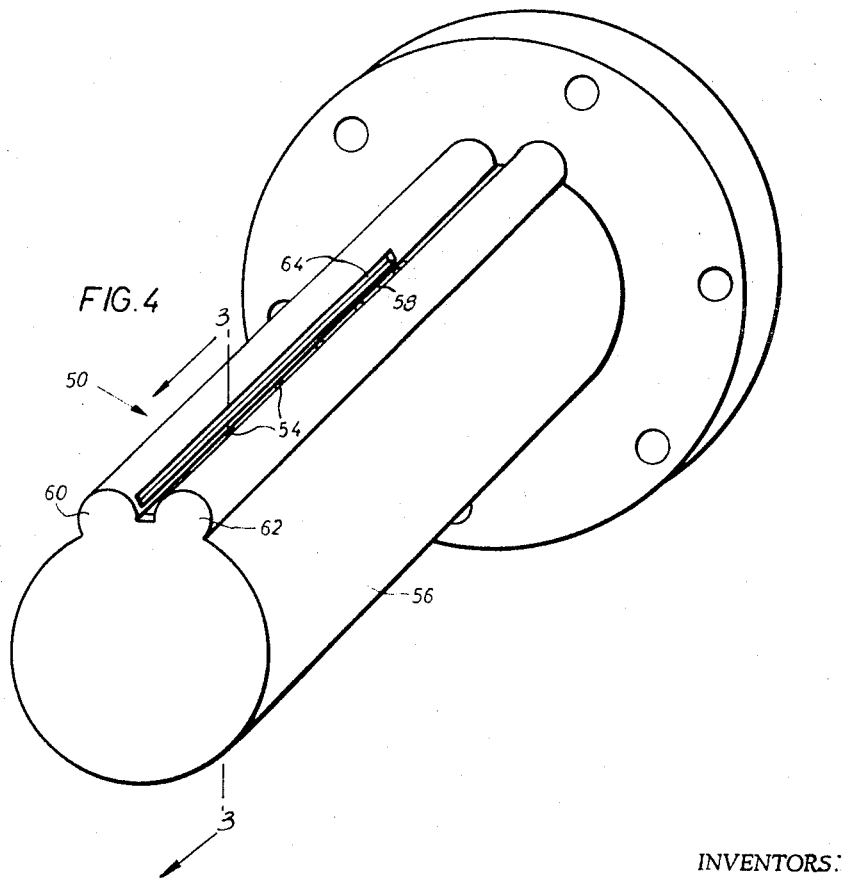

United States Patent Office 3,450,184
Patented June 17, 1969

3,450,184
APPARATUS FOR SEPARATING POLYMERS FROM THEIR SOLUTIONS
Hildegard Schnoring, Wuppertal-Elberfeld, Willy Classe and Gottfried Pampus, Cologne-Stammheim, and Nikolaus Schon, Leverkusen, and Josef Witte, Cologne-Stammheim, Germany, assignors to Farbenfabriken Bayer Aktiengesellschaft, Leverkusen, Germany, a corporation of Germany
Filed July 18, 1966, Ser. No. 566,034
Claims priority, application Germany, July 24, 1965, F 46,749
Int. Cl. B01d 1/14
U.S. Cl. 159—16                         5 Claims

ABSTRACT OF THE DISCLOSURE

Arrangement for separating polymers from organic solvents comprises inner polymer conveying tube closed at one end having charging opening at its other end. Outer eccentric tube surrounds inner tube to convey encasing liquid and discharge openings in sides of inner tube and outer eccentric tube are located along line where tubes achieve maximum proximity so that encasing liquid is discharged around polymer solution as solution flows through opening in inner tube. Steam conveying tubing outside outer eccentric tube has discharge opening in close proximity to outer eccentric tube for discharging steam onto encasing liquid surrounding polymer solution to vaporize organic solvent and separate polymer from solvent.

---

This invention relates to a method and apparatus for separating polymers from organic solvents.

As background it will be understood that prior to the present invention numerous methods and machines have been proposed for separating polymers from their organic solvents, but none have been found completely satisfactory. For the most part, in the heretofore available machines the viscous organic polymer solution is extruded in the form of a hollow tube and steam is directed onto the formed tube at right angles to the tube surface. Such treatment causes the tube to disintegrate into particles as the solvent is vaporized and removed. The particles obtained are flushed out of the apparatus with water, simultaneously chilled, taken up in water and dried in the usual manner (see German Auslegeschrift 1,120,138). The prior polymer separating apparatus is extraordinarily complicated and is not suitable for working sticky solutions since cleaning the apparatus in the event of stoppage or breakdown is extremely difficult.

Machines having movable parts have been proposed for processing a variety of polymer solutions, but these movable parts render the apparatus extremely complicated and cumbersome. Additionally, the quantities of polymer processed per unit time are relatively small in relation to the technical and commercial expenditure thus making the prior devices unsatisfactory from an economic standpoint.

Accordingly, it is an object of the present invention to provide an apparatus for separating polymers from polymer solutions and dispersions in a highly efficient and satisfactory manner.

Another object of the present invention is to provide a method of separating polymers from solutions and dispersions.

In accordance with the present invention an apparatus is provided consisting essentially of two tubes fixed eccentrically one within the other so that they almost contact each other at one point on their circumferences. The two tubes include longitudinally disposed discharge openings positioned where they have the least spacing from one another so that polymer solution in the inner tube can pass through the outer eccentric tube at this point. Encasing liquid in the outer eccentric tube, can also pass outwardly, the liquid in the outer tube surrounding the polymer solution flowing from the inner tube.

The double-walled slotted nozzle arrangement can fit into a second eccentric tube having an opening for discharging steam onto the encased polymer solution. Alternatively, however, a pair of thin tubes can be positioned outside the nozzle arrangement along the sides of the slot in the outer eccentric tube, each tube of the pair having a discharge opening which faces the slot in the outer eccentric tube.

Other objects and advantages of the present invention will become apparent to one skilled in the art from a reading of the following description in conjunction with the accompanying drawings wherein similar reference characters refer to similar parts and in which:

FIG. 3 is a transverse sectional view of another embodiment according to the present invention taken along line 3—3 of FIG. 4; and FIG. 4 is a perspective view of an arrangement illustrated in FIG. 3.

Figure 1:
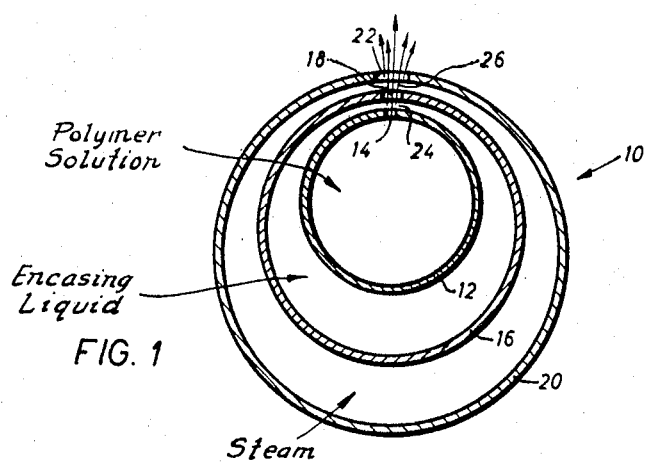
FIG. 1 is a transverse sectional view of an arrangement according to the present invention.

Referring in more particularity to the drawings, a nozzle arrangement 10 comprises an inner tube 12 having a discharge opening in the form of a longitudinal slot 14. Other types of discharge opening are equally suitable such as a plurality of apertures, for example. The inner tube 12 is surrounded by an eccentric outer tube 16 having a similar discharge opening which may be a slightly larger longitudinal slot 18. The inner tube 12 and the eccentric outer tube 16 are enclosed by a second eccentric tube 20 having a longitudinal slot-like discharge opening 22 in line with the slots of the other tubes. The tubes are arranged so that adjacent tubes are closest to each other at their slotted openings. As shown in FIG. 1 the inner tube 12 almost contacts the outer eccentric tube 16 at the discharge openings thereby providing a gap 24 between the inner tube 12 and the outer eccentric tube 16. Additionally, the outer eccentric tube 16 almost engages the second eccentric tube 20 at the openings to thereby form a gap 26 between these two tubes.

The material of the nozzle arrangement 10 can be resistant to corrosion and preferably conform to the standard for stainless steels (DIN 17440). Thus the tubes are usually made from metal, preferably from stainless steel and can have a length of 50 to 2000 mm., preferably about 500 mm.

The second eccentric tube 20 is connected to convey steam to its longitudinal slot 22 while the outer eccentric tube 16 conveys encasing liquid to its longitudinal slot 18. The eccentric tubes 16 and 20 have a common closure flange which may be located in a liquid bath during operation of the nozzle arrangement. The eccentric tubes are secured one within the other so as to provide a gap of 1–10 mm. between the common closure flange of the eccentric tubes 16 and 20, and the closure flange of the inner tube 12, which inner tube conveys the polymer solution and is located within the outer eccentric tube 16.

The diameters of the tubes of the arrangement 10 can be in a ratio of approximately 1:2:3, and when the innermost smallest tube 12 has a total length of approximately 500 mm. that tube should have a diameter of about 20 mm. Thus, the ratio of length to diameter of the inner tube is approximately between 5:1 and 30:1. The thickness of the wall of the tubes may be about 1–2 mm.

The free outlet area of each milled slot-like opening can be about 0.05 to 0.3 times the cross-sectional area of the tube itself and the width of the slot should be between 1 and 10 mm.

The polymers may be isolated from their solutions or dispersions in organic solvents by means of the arrangement described above according to the following procedure. The polymer solution or dispersion is introduced into the inner tube 12 of the nozzle arrangement 10 so that it passes through the longitudinal slot 14. At the same time, an encasing liquid is introduced into the outer eccentric tube 16 and this liquid flows through the longitudinal slot 18 thereby surrounding the polymer solution discharging from the inner tube 12 in a continuous stream. Steam in the second eccentric tube 20 flows through the longitudinal slot 22 onto the stream of polymer solution surrounded by encasing liquid. The steam functions to vaporize the polymer solvent and the polymer is obtained in particulate form.

The enclosing or encasing liquid discharging through the outer eccentric tube 16 may have a boiling point between 10° C. and 150° C., for example alcohols, ketenes, esters, ethers or hydrocarbons, and preferably water admixed with one of these solvents. The polymer to be isolated should be insoluble or sparingly soluble in the encasing liquid and the temperature of that liquid should be approximately 0.5° C. to 50° C. below the boiling temperature of an azeotrope being processed which azeotrope is simply a mixture of organic solvent and water which may have a boiling point lower than the boiling point of water.

The nozzle arrangement 50 illustrated in FIGS. 3 and 4 is another embodiment of the present invention and comprises an inner tube 52 having a discharge opening in the form of a plurality of apertures 54. The inner tube is surrounded by an eccentric outer tube 56 having a discharge opening which may be a longitudinal slot 58. In the nozzle arrangement 50 the second eccentric tube of the previously described embodiment is replaced by a pair of substantially parallel tubes 60, 62 positioned outside the outer eccentric tube 56. The parallel tubes 60, 62 are arranged alongside the longitudinal slot-like opening 58 in the outer eccentric tube and have discharge slot-like openings 64, 66 facing the opening in the outer tube.

In operation, the inner tube 52 of the nozzle arrangement 50 conveys polymer solution to the discharge opening 54. As the solution flows through the opening in the inner tube the encasing liquid discharging from the opening in the outer eccentric tube 56 flows around the polymer solution. Steam is then directed onto the encasing liquid from the steam discharge slots 64, 66 in the tubes 60, 62. The steam vaporizes the organic solvent which separates the polymer from the solvent in the same manner as described above in conjunction with the nozzle arrangement 10.

Encasing liquids of the type described above may be utilized in the arrangement 50 with the same superior results. Additionally, the discharge openings in each of the tubes of the arrangement 50 can have a free outlet area of approximately 0.05 to 0.3 times the cross-sectional area of the tube itself and the width of the slots should be between 1 and 10 mm.

The quantities of polymer solution, encasing liquid and steam in each of the above described embodiments can be arranged so that the outlet volume ratio between the polymer solution and the encasing liquid is approximately 1:0.2 to 1:10, preferably 1:1. Steam should be employed in sufficient quantities to heat the encasing liquid to the ambient temperature in the reactor in which the operation takes place and to vaporize the solvent of the polymer solution to about 10 to 100%, preferably 50%. The working pressure of the steam can be approximately 6 atm. gauge.

Preferably, the apparatus of the present invention can be placed in a liquid bath so that the particles of formed polymer can be collected in the liquid of that bath. Generally, the liquid bath has the same composition as the encasing liquid and the temperature of the bath is near the boiling point of the solvent for the polymer or close to the boiling point of the azeotropic mixture of solvent and water, preferably to within 20° C. It is advantageous to use the same substance preferably water as the liquid bath and as the encasing liquid.

A reaction vessel of the type commonly used in the commercial industry can be utilized as a reactor, the top of the vessel merging into a condenser. The container should be filled to about ⅓ to ½ of its volume.

During operation of the apparatus of the instant invention the encasing liquid is displaced in the vicinity of the steam, so that the stream of polymer solution or suspension passes through a steam zone and then directly into the liquid bath. The method is suitable for separating the solvent or solvents from all those polymers which do not enter into undesirable reactions with the components of the liquid bath or the liquid encasing sheath.

The polymers can be wholly or partially dissolved, suspended, or emulsified in the solvents. The solutions or suspensions can also contain a second liquid phase in the form of an emulsion. The solutions, suspensions or emulsions can in addition contain substances which it is desired to keep admixed, in the polymer, such as pigments, inorganic or organic fillers or extender oils.

Examples of polymers which may be processes are polydiolefines, such as polyisoprene, polybutadiene, polychlorobutadiene, and also copolymers of isoprene, butadiene or of butadiene with styrene, acrylonitrile or methacrylates. One can also use polyolefines such as polyethylene, copolymers of ethylene with alpha-olefines, polyisobutylene as well as their halogenation products, and also copolymers of ethylene and vinyl acetate, polypropylene oxide and polymers based on polyurethanes. The present method is particularly suitable for the separation of the solvent from solutions of rubber-like polymers, which are sticky. The present method leads to formation of polymer particles of uniform size and with a very small residual content of solvent and which have a low tendency to cake together, and furthermore the particles have a loose structure with pores which are substantially open, so that the removal of adhering liquid or occluded liquid originating from the liquid bath or the encasing liquid is substantially facilitated.

*Example 1*

A solution of 1,4-cis-polyisoprene in benzene is obtained by polymerization of isoprene with a metal complex catalyst. This solution (4200 l./h.) containing about 9% of elastomers is fed through the elastomer precipitation nozzle into a reactor filled with hot water (95° C.).

Figure 2:
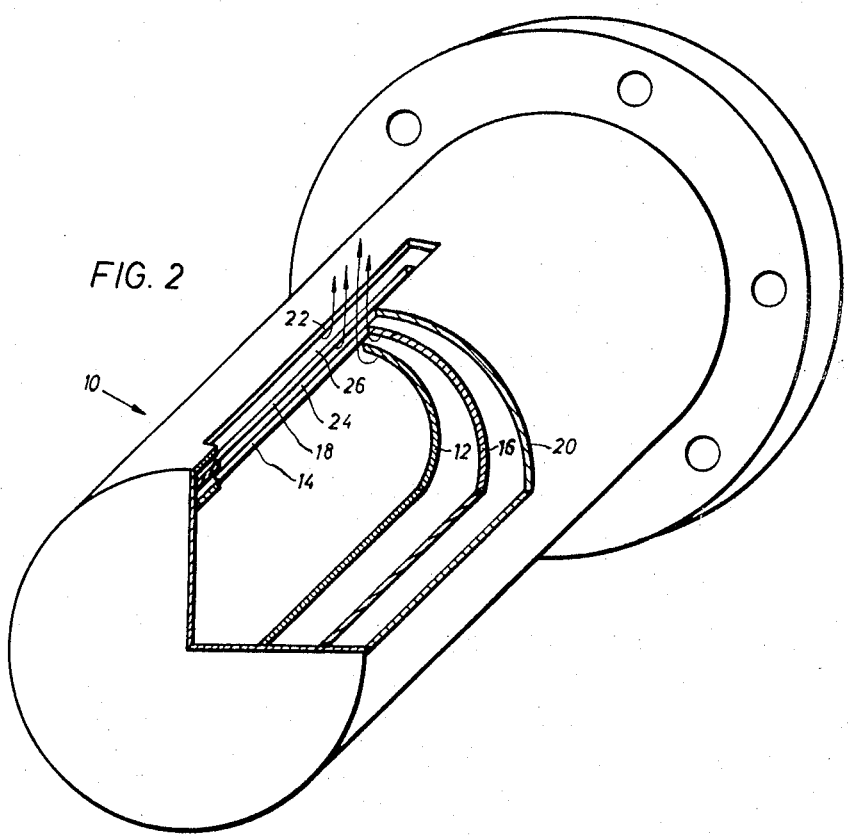
FIG. 2 is a perspective view of the arrangement shown in FIG. 1 with parts broken away to show detail.

The elastomer precipitation nozzle arrangement was a nozzle according to FIGS. 1 and 2. The inner tube had a length of 50 mm. and an internal diameter of 6 mm. and a wall thickness of 1 mm. The discharge slot in this tube was 15 mm. long and 1 mm. broad.

The outer eccentric tube was 60 mm. long, had an internal diameter of 12 mm. and a wall thickness of 1.5 mm. The longitudinal slot in this tube was 16 mm. long and 2 mm. broad.

The second eccentric tube was 60 mm. long, had an internal diameter of 18 mm. and 2 mm. wall thickness. The discharge slot was 15 mm. long and 2.8 mm. broad. The eccentricity of the three tubes was arranged in such a way the gap between the inner tube and the outer eccentric tube was 2 mm. and between the outer eccentric tube and the second eccentric tube the gap was 1 mm.

Fresh water as an encasing liquid (50 l./h.) and steam (15–60 m.³/h.) at 6 atm. pressure are also injected into the reactor through the discharge openings in their respective tubes. The thermal requirements of the reactor and the quantity of heat required for vaporizing the organic solvent are partly covered by the quantity of steam entering the reactor from the steam conveying tubing of the precipitation nozzle. Differences between the heat supplied and the heat required are compensated for by introducing some steam into the reactor at a different position, for example through openings in the bottom of the reactor. The amount of additional steam depends on the temperature loss which is induced by the vaporization of the organic solvent. The size of particles of the elastomer being formed decreases with increasing steam output, and is between 3 and 40 mm.

The residual content of solvent in the elastomer discharged from the reactor is between 0.5 and 5%, depending on the size of the particle diameter.

*Example 2*

A solution of 1,4-cis-polybutadiene in toluene is obtained by polymerization of butadiene with an organometallic mixed catalyst. The solution was passed at 100 l./h. through the elastomer precipitation nozzle into a reactor filled with hot water.

The nozzle arrangement used corresponds to FIGS. 3 and 4. The inner tube had a length of 80 mm. an internal diameter of 6 mm. and a wall thickness of 1 mm. The six bores forming the discharge opening were spaced a distance of 10 mm. and each had a diameter of 1.8 mm.

The outer eccentric tube was 100 mm. long, had an internal diameter of 18 mm. and a wall thickness of 1.5 mm. The discharge slot in this tube was 70 mm. long and 2.5 mm. broad.

The pair of steam conveying tubes were 60 mm. long, had an internal diameter of 6 mm. and 1 mm. wall thickness. The discharge slot was 1 mm. broad and 58 mm. long.

Fresh water as an encasing liquid (50 l./h.) and working steam at 6 atm. pressure are injected into the reactor through the discharge openings in their respective tubes. The steam output through the discharge openings in the steam conveying tubing is 10–20 m.$^3$/h., depending upon the particle size of the precipitated polymer which is required. The thermal energy needed to vaporize the solvent is partly accounted for by the steam which passes into the reactor through the discharge opening in the steam conveying tubing, and partly by steam introduced elsewhere into the reactor for example, through openings in the bottom of reactor, the amount of additional steam depending upon the thermal loss induced by the vaporization of the organic solvent. The particle size of the elastomer is inversely proportional to the steam output and is between 3 and 40 mm.

The residual content of solvent in the elastomer discharged from the reactor is between approximately 0.5 and 5% depending on particle size.

What is claimed is:

1. An arrangement for separating polymers from organic solvents comprising an inner polymer conveying tube closed at one end and having a charging opening at its other end, an outer eccentric tube surrounding the inner tube connected to convey an encasing liquid, discharge openings in the sides of the inner tube and the outer eccentric tube located along the line where the tubes achieve maximum proximity so that encasing liquid is discharged around the polymer solution as the solution flows through the opening in the inner tube, and steam conveying tubing outside the outer eccentric tube having a discharge opening in close proximity to the opening in the outer eccentric tube connected to discharge steam onto the encasing liquid surrounding the polymer solution to vaporize the organic solvent and thereby separate the polymer from the solvent.

2. An arrangement for separating polymers from organic solvents as in claim 1 wherein the steam conveying tubing comprises a second eccentric tube, the discharge opening in the second eccentric tube being positioned along the line where the eccentric tubes achieve maximum proximity.

3. An arrangement for separating polymers from organic solvents as in claim 2 wherein the discharge openings in the inner tube, the outer eccentric tube, and the second eccentric tube are longitudinal slots substantially parallel to the axes of the tubes.

4. An arrangement for separating polymers from organic solvents as in claim 1 wherein the steam conveying tubing comprises a pair of substantially parallel tubes arranged alongside the discharge opening in the outer eccentric tube with a discharge opening in the side of each steam conveying tube.

5. In an arrangement for separating polymers from organic solvents as in claim 4 wherein the discharge opening in the inner tube comprises a plurality of apertures arranged along a line substantially parallel to the axis of the inner tube, and the discharge openings in the outer eccentric tube and the pair of steam conveying tubes comprise longitudinal slots substantially parallel to the axes of the eccentric tubes.

References Cited

UNITED STATES PATENTS

| 2,025,331 | 12/1935 | Bullum | 239—419.3 |
| 2,840,149 | 6/1958 | Arnold | 239—423 X |
| 3,009,826 | 11/1961 | Straugh et al. | 239—419.3 X |
| 3,050,113 | 8/1962 | Rundquist | 159—13 |
| 3,306,342 | 2/1967 | Salvo et al. | 159—16X |

FOREIGN PATENTS

| 21,675 | 1907 | Great Britain. |
| 206,588 | 2/1957 | Australia. |

NORMAN YUDKOFF, *Primary Examiner.*

J. SOFER, *Assistant Examiner.*

U.S. Cl. X.R.

239—419.3, 422, 428; 264—11, 12